April 15, 1930.    W. BOUCHER    1,754,497
GRAIN DRILL
Filed March 12, 1928    2 Sheets-Sheet 1
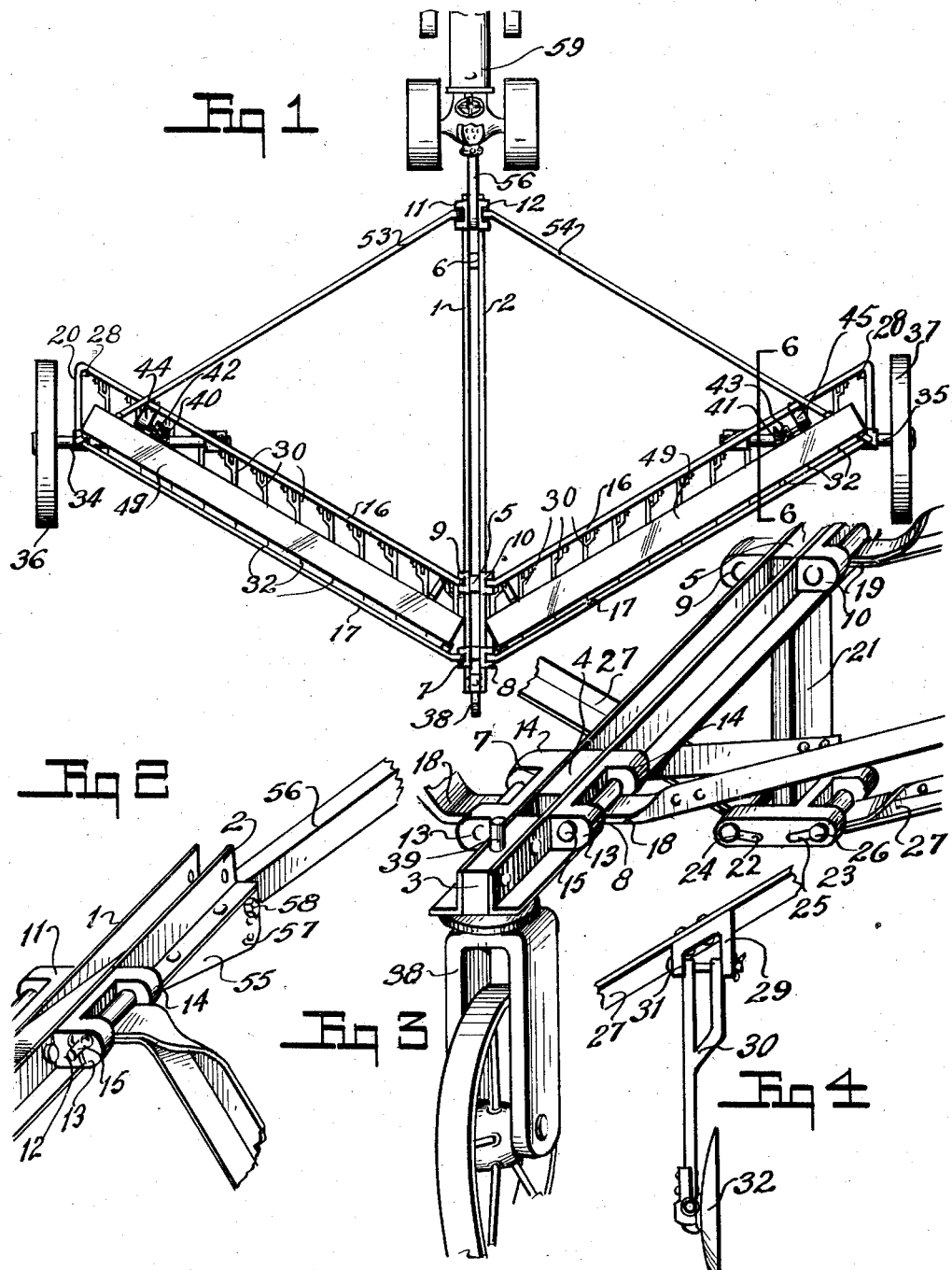
INVENTOR
Wallace Boucher
BY
ATTORNEY April 15, 1930.                W. BOUCHER                1,754,497
                                GRAIN DRILL
                           Filed March 12, 1928        2 Sheets-Sheet 2
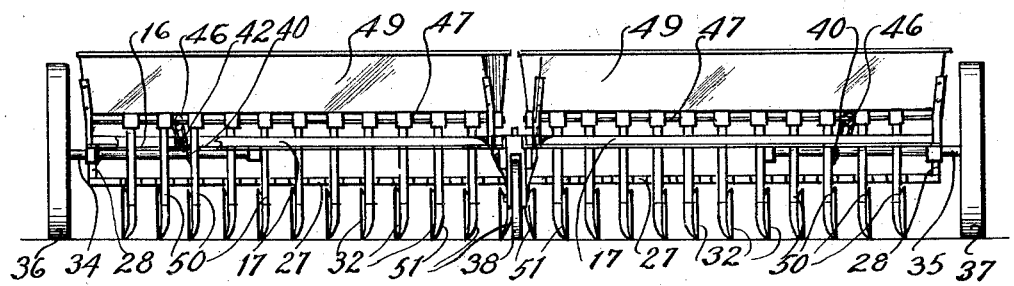
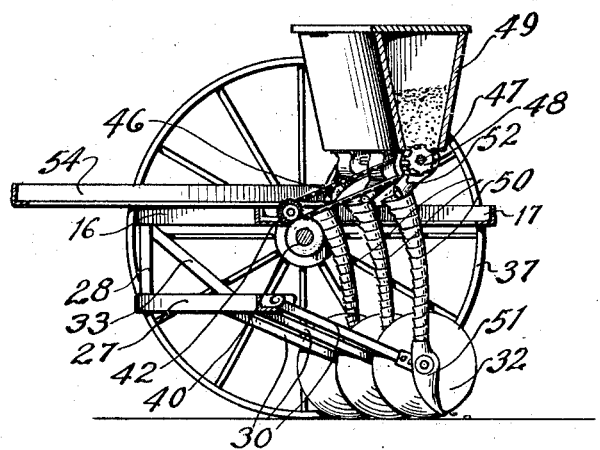
INVENTOR
Wallace Boucher
BY
B. J. Funk ATTORNEY Patented Apr. 15, 1930

1,754,497

UNITED STATES PATENT OFFICE

WALLACE BOUCHER, OF MINNEOLA, KANSAS

GRAIN DRILL

Application filed March 12, 1928. Serial No. 261,022.

This invention relates to a grain drill, the primary object being to provide a grain drill which will effectually introduce the seed grain into the ground at uniform intervals and at uniform depths, as well as to provide means whereby the driver of a tractor for propelling the drill over the ground may observe the discharge ends of the grain spouts or boots so that he can tell whether or not the grain is discharging properly.

It is also the purpose of my invention to provide a grain drill capable of being attached to the tractor with an ordinary hitch so that the grain drill will follow behind the tractor in making turns and thereby eliminate the difficulty encountered with the ordinary multiple gang grain drill. Prior to my invention it was customary to attach a plurality of gangs of grain drill elements to a cross-bar, each gang having more or less freedom of movement, particularly sidewise movement. As a result, whenever a tractor turned a corner, there was liability of the front wheels of the tractor skidding due to the fact that there is a side thrust created by the drills. Since the tractor is working in loose ground, the front wheels do not hold well enough to permit a short turn and as a result, the outside drill drifts into the fence. With my invention, the frame, in so far as the forward movement is concerned, is rigid although provision is made for an up and down movement of the drill elements to take care of inequalities in the ground and to insure the grain being fed at proper depths into the ground and by providing the frame substantially rigid so that the two gangs of drill elements operate practically as a single unit with the concave faces of the discs in each gang facing away from the longitudinal center, the tendency to sidewise movement will be equalized. The construction is such that the draft is comparatively light and by providing the discs on each side of the longitudinal center, one slightly in advance of the other so that the angles of their shaft are acute with respect to the longitudinal center, tendency to clogging or dragging of loose trashy ground in front of the discs is eliminated. This is a material advantage over machines employing discs whose axials are at right angles to the line of draft. Another advantage of my invention is that the seed boxes can be easily filled from a wagon driven in rear of the frame, a feature which is not possible where a plurality of gangs in stepped relation are fastened to a cross-bar. The latter method is also objectionable because in so far as I am aware, no adequate method has been devised for hitching the several gangs to a tractor, the common means now generally employed for propelling drills.

The novelty of my invention will be more thoroughly understood by reference to the following description in connection with the accompanying drawings in which:

Fig. 1 is a top plan view of a drill constructed in accordance with my invention.

Fig. 2 is an enlarged view of the hitch.

Fig. 3 is an enlarged view of the draw-bar or the longitudinal frame-bar showing the tail or castor wheel and the means for securing the side gangs to the draw-bar.

Fig. 4 is an enlarged view of the disc supporting bar and one of the discs connected thereto.

Fig. 5 is a rear view of the drill and

Fig. 6 is a sectional view on the line 6—6 of Fig. 1.

The draw-bar is shown as consisting of two commercial angle irons 1 and 2 held in spaced relation by the blocks 3, 4, 5 and 6. The draw-bar carries hinge members 7, 8, 9, 10, 11 and 12 to provide flexible connections between the gangs and the draw-bar. The hinge members each consist of a bar with outstanding lugs 13 and 14 provided with pins or pintles 15 around which the ends of the gang frames are bent so that the outer ends of the gang frames can move up and down to a slight extent as the drill is being propelled over the ground. The gang frames on opposite sides of the longitudinal center bar or draft bar are substantially alike in construction. Each consists of outwardly and forwardly disposed parallel bars 16 and 17, the ends 18 and 19 of which engage the pintles 15. The outer ends of the bars 16 and 17 are connected by an end tie-bar 20, the length of which is approximately equal to the distance between the inner ends of the bars 17 and 18 so that a substantially rectangular gang frame is provided. Depending from the draft-bar or center bar, consisting of the angles 1 and 2, is a bracket-bar 21 having two clevis-like hinged end members 22 and 23 provided with slightly elongated slots 24 and 25 in which are pins 26 to which the ends of the brace-bars 27 are fastened, there being one for each gang frame. The brace-bars 27 are connected to the rectangular gang frame bars by depending bars 28 so that they are hung below the gang frames and in turn become gang bars for the discs. There are a plurality of brackets 29 on the bars 27 to which are pivoted disc bars or tongues 30 at 31, the outer end of the bar 30 carrying the discs 32 which are pulled over the ground. The bars 28 are additionally braced to the bars 27 by the brace-bars 33. The gang frames carry axials 34 and 35 on which the traction wheels 36 and 37 are mounted, the rear of the frame being supported by a castor wheel 38, having its spindle 39 in the block 3 as will be clearly understood by reference to Figure 3. The axials carry bevelled gears 40 and 41 which mesh with bevelled gears 42 and 43 in the bars 44 and 45 and these gears carry sprockets to drive the chains, one being shown at (Fig. 6) which rotate the shafts 47 on which the measuring sheels 48 for the seed boxes 49 are mounted. The mechanism for feeding the seed is old and well known and forms no part of my invention. The seed boxes discharge in the usual way into the spouts or boots 50 with the usual discharge ends or shoes 51 terminating just above the ground so that the grain will be deposited into the ground in the usual way. The feeding shaft 47 will rotate in a clock-wise direction, as viewed in Fig. 6, allowing the grain to be deposited into the troughs 52 so that the operator from the tractor, by looking backward, can have a full view of the feeding mechanism to determine whether the grain is dropping into the spouts or boots. The outer ends of the gang frames are connected to forward and inward braces or tie-bars 53 and 54 which are fastened to the hinge members 11 and 12 so that the members 53 and 54 become tension members, preventing the outer ends of the gang frames from swinging backwards but allowing a free up and down movement of the outer ends of the frame permitting the frame to adjust itself to the lay of ground at all times. It will be apparent then that the frame is substantially diamond-shaped and that for all intents and purposes, it is rigid except that the gang may have the slight up and down movement as heretofore explained. At the forward end of the center bar, consisting of the angles 1 and 2, is a clevis 55 to which a hitch or draft-bar 56 may be adjusted by means of the holes 57 and the bolt 58, to elevate or depress the bar 56 with respect to the particular tractor 59 used as the propelling means.

From the foregoing it will be apparent that the drill can be made of any appropriate width, that is, to provide any number of discs and drill spouts, that is free from side-thrust and therefore will follow directly behind the tractor, that it can be attached to the tractor by an ordinary hitch, that it will evenly feed the grain in the ground irrespective of slight inequalities in the ground and that the operator from the tractor will at all times have the discharges of the feed boxes where he can view them to determine how the drill is feeding. Therefore, a drill constructed in accordance with my invention is a material impovement over those employing methods common to the arts.

The discs may be forced into the ground with the common coil spring and plunger construction usually employed with present day drills, but inasmuch as the particular drilling mechanism used is immaterial, I have deemed it unnecessary to elaborately show any particular means for forcing the discs into the ground.

What I claim and desire to secure by Letters Patent is:—

1. A grain drill comprising a central longitudinal draft-bar, two gang frames fastened to the rear portion of the draft-bar with their outer ends in advance of the rear ends of the gangs, tie-bars connecting the outer ends of the gang frames to the forward end of the draft-bar, discs connected to the gang frames and grain feeding mechanism above the discs.

2. A grain drill comprising a central longitudinal draft-bar, gang frames secured to the rear end of the draft-bar on opposite sides thereof with their outer ends extending in advance of the point at which the gang frames are secured to the draft-bar, tie-rods for connecting the outer ends of the gang frames to the forward end of the draft-bar, seed feeding mechanism associated with the gang frames and discs carried by the gang frames.

3. A grain drill comprising a central longitudinal draft-bar, gang frames secured to the rear end of the draft-bar on opposite sides thereof with their outer ends extending in advance of the point at which the gang frames are secured to the draft-bar, tie-rods for connecting the outer ends of the gang frames to the forward end of the draft-bar, seed feeding mechanism associated with the gang frames, discs carried by the gang frames, wheels carried by the outer ends of the gang frames and a castor wheel supporting the rear end of the draft-bar.

In testimony whereof I affix my signature.

WALLACE BOUCHER.